United States Patent
Peterson et al.

(10) Patent No.: US 6,598,197 B1
(45) Date of Patent: *Jul. 22, 2003

(54) METHOD AND APPARATUS FOR DETECTING AND CONCEALING DATA ERRORS IN STORED DIGITAL DATA

(75) Inventors: Eric Carl Peterson, Noblesville, IN (US); Tibor George Csicsatka, Fishers, IN (US); Sin Hui Cheah, Singapore (SG)

(73) Assignee: Thomson Licensing S.A., Boulogne (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/242,196

(22) PCT Filed: Jun. 14, 1997

(86) PCT No.: PCT/SG97/00024

§ 371 (c)(1),
(2), (4) Date: Jun. 3, 1999

(30) Foreign Application Priority Data

Jun. 12, 1997 (SG) ............................................. 9702064

(51) Int. Cl.⁷ ............................................. G11C 29/00

(52) U.S. Cl. ....................................... 714/763; 714/758

(58) Field of Search ................................ 714/763, 746, 714/747, 752, 800, 701, 758, 799, 801; 386/46, 113, 36, 37; 375/240.01

(56) References Cited

U.S. PATENT DOCUMENTS

| 5,047,865 A | * | 9/1991 | Inoue ...................... 375/240.01 |
| 5,414,758 A | | 5/1995 | Kuok ........................... 379/88 |
| 5,587,807 A | * | 12/1996 | Ootsuka et al. .............. 386/113 |
| 5,596,558 A | | 1/1997 | Arataki et al. ................. 369/53 |
| 5,600,821 A | | 2/1997 | Falik et al. .................. 395/497 |
| 5,781,564 A | * | 7/1998 | Peterson ..................... 714/747 |

FOREIGN PATENT DOCUMENTS

| EP | 381405 | 8/1990 |
| JP | 4-122137 | 4/1992 |

OTHER PUBLICATIONS

Patent Abstracts of Japan, vol. 016, No. 381 & Jp 4–122137.

Masao Fukuma et al "Memory LSI Reliability", Proceedings of the IEEE, vol. 81, No. 5, May 1, 1993, pp. 768–774.

A. Hegde "Detect/Correct Errors To Improve Data Reliability" Electronic Design, vol. 40, No. 12, Jun. 11, 1992, pp. 75–76, 78, 80, 81, 83.

Gideon Intrater et al. "A Single–Chip Controller for Digital Answering Machines" IEEE Transactions on Consumer Electronics, vol. 39, No. 1, Feb. 1, 1993, pp. 45–48.

* cited by examiner

*Primary Examiner*—Albert DeCady
*Assistant Examiner*—Guy Lamarre
(74) *Attorney, Agent, or Firm*—Joseph S. Tripoli; Robert D. Shedd

(57) ABSTRACT

A method and apparatus is disclosed for detecting and concealing errors in stored digital samples. A multibit digital input sample is received and an error detecting code, corresponding to that input sample is calculated. Then a multibit digital storage sample is generated by substituting the error detecting code for the same number of least significant bits of the input sample. The storage sample is then stored in a memory device. A previously stored sample is retrieved from the memory device and is analyzed to detect whether an error has occurred. If an error is detected, a substitute sample is produced for the retrieved sample, otherwise the retrieved sample is produced.

6 Claims, 6 Drawing Sheets

METHOD AND APPARATUS FOR DETECTING AND CONCEALING DATA ERRORS IN STORED DIGITAL DATA

The present invention relates to a method and apparatus for using less reliable memory devices for temporary storage of multibit digital data.

It is often necessary to temporarily store multibit digital data during processing of that data. Memory devices are used for such storage. In general, it is imperative that the data retrieved from such memory devices be an exact replica of the data previously stored. However, in some applications, while it is highly desirable that the retrieved data be a replica of the previously stored data, it is not imperative.

One example of such an application is the processing of audio data in digital form, such as in portable CD players—especially portable CD players with headphones, video camcorders, tapeless telephone answering machines or tapeless audio recorders. Such applications do not require the absolute fidelity which, for example, a computer storage device requires. In such devices, an analog audio signal is represented by a sequence of multibit digital samples, each having a binary value representing the value of the corresponding analog audio signal. Such samples may, for example, be produced by an analog-to-digital converter coupled to an analog audio signal source, or by a digital CD player. During the processing of this audio signal, the series of digital samples representing the audio signal is stored in a memory device, and later retrieved for subsequent processing.

In the applications described above, which do not require absolute fidelity of retrieved data to the previously stored data, memory devices which are not perfect, termed audio read/write memory (ARAM) devices, may be used. These less-than-perfect memory devices are less expensive than perfect memory devices. Because some infidelity in the retrieved samples is permissible, the use of such memory devices will allow for less expensive audio equipment without a noticeable degradation in performance. Prior such systems provided no handling for errors caused by data storage and retrieval errors. However, this resulted in seriously degraded performance when an error occurred. It is desirable that some way of handling errors resulting from the use of such memory devices be provided.

In accordance with principles of the present invention, a method and apparatus detects and conceals errors in stored digital samples. A multibit digital input sample is received and an error detecting code corresponding to that input sample, and having a predetermined number of bits, is calculated. Then a multibit digital storage sample is generated by substituting the error detecting code for the predetermined number of bits of the input sample. The storage sample is then stored in a memory device A previously stored sample is retrieved from the memory device and is analyzed to detect whether an error has occurred. If an error is detected, a substitute sample which conceals the error via some means, such as interpolation is produced for the retrieved sample, otherwise the retrieved sample is produced.

Apparatus incorporating this invention may use less than perfect memory devices, such as ARAMs, for storage of digital samples for which absolute fidelity is not required. This results in a lower costs, while not noticeably degrading the performance for such systems.

Figure 1:
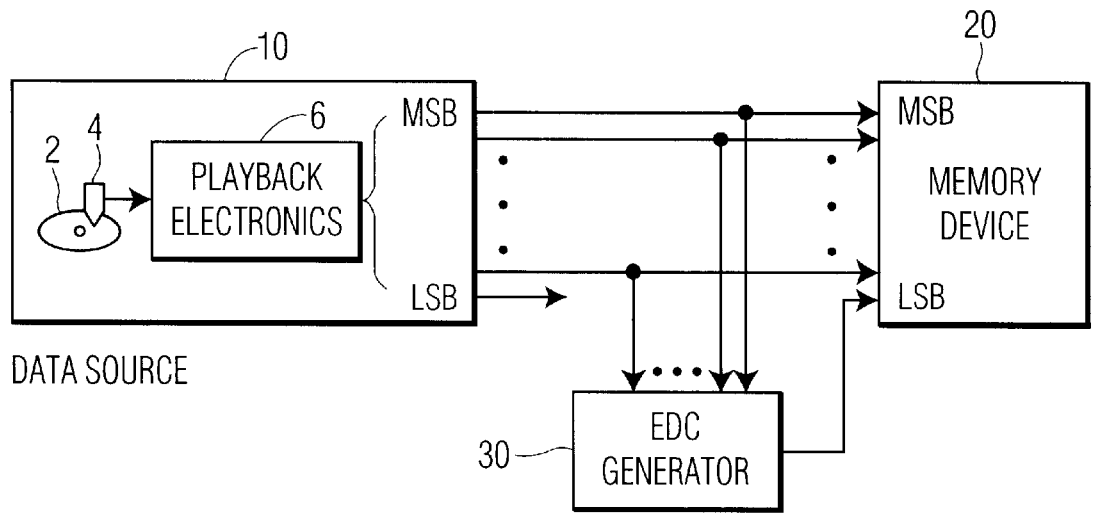
FIG. 1 is a block diagram of apparatus according to the present invention for writing data into a memory device.

FIG. 1 is a block diagram of apparatus according to the present invention for writing data into a memory device. In FIG. 1, a data source 10 generates, in a known manner, a stream of successive multibit digital samples, each consisting of a plurality of bits arranged in a known manner from a least significant bit (LSB) to a most significant bit (MSB). For example, in FIG. 1, a compact disk (CD) drive 2 spins a CD. A laser pickup head 4 reads data from the spinning CD and generates a signal representing the CD data. The CD data represents a previously recorded, possibly stereo, audio signal. The playback signal is processed by playback electronics 6 to generate a series of sixteen bit digital samples representing the audio signal, all in a known manner. These digital samples are produced, successively, at an output terminal of the data source 10.

The output terminal of the data source 10, with the exception of the LSB, is coupled to respective input terminals of an error detecting code (EDC) generator 30 and a memory device 20. An output terminal from the EDC generator 30 is supplied to the LSB input terminal of the memory device 20 input terminal, in place of the LSB from the digital data source.

The EDC generator 30 may be any one of known generators of one of more error detecting code bits, and in the illustrated embodiment is a parity generator 30. In general, the number of error detecting code bits generated by the EDC generator 30 are substituted for the same number of LSBs in the word from data source 10 before being stored in the memory device 20. The remainder of the application will refer to the parity generator 30 and single parity bit, but one skilled in the art will understand that any one of the known error detecting code generators, generating any number of error detecting code bits, may be used in its place.

In operation, the memory device 20 is a less-than-perfect memory device, and may include some memory locations which produce erroneous results when data is retrieved from those locations. To provide error detection for the memory device 20, without increasing the required memory capacity, the resolution of the digital data represented by the digital data stream is reduced (e.g. by one data bit), and an error detection code, (e.g. in the form of a parity bit), is substituted for that data bit. For example, for a 16-bit digital audio signal, the LSB is stripped from each sample, resulting in an audio signal having a resolution of 15-bits. As described above, for some audio applications, such as telephone answering machines, this loss of resolution is unnoticeable by a user.

The parity generator 30 generates, in a known manner, a parity bit for the full sized (16 bit) digital sample, less any bits that will be discarded, supplied to its input terminal. In the illustrated embodiment, the parity bit is an odd parity bit, although an even parity bit may also be used. This parity bit is appended to the reduced resolution (15 bit) digital audio signal sample as its LSB. The nature of the parity bit is that it has the values logic '1' and logic '0' about equally. The DC offset resulting from appending this bit to a digital sample as the LSB, thus, is negligible, even during silent periods. In addition, the use or the parity bit as the LSB provides a desirable dithering function. This parity encoded digital sample is stored in the memory device 20 at locations controlled in a known, manner by a memory controller (not shown).

Figure 2:
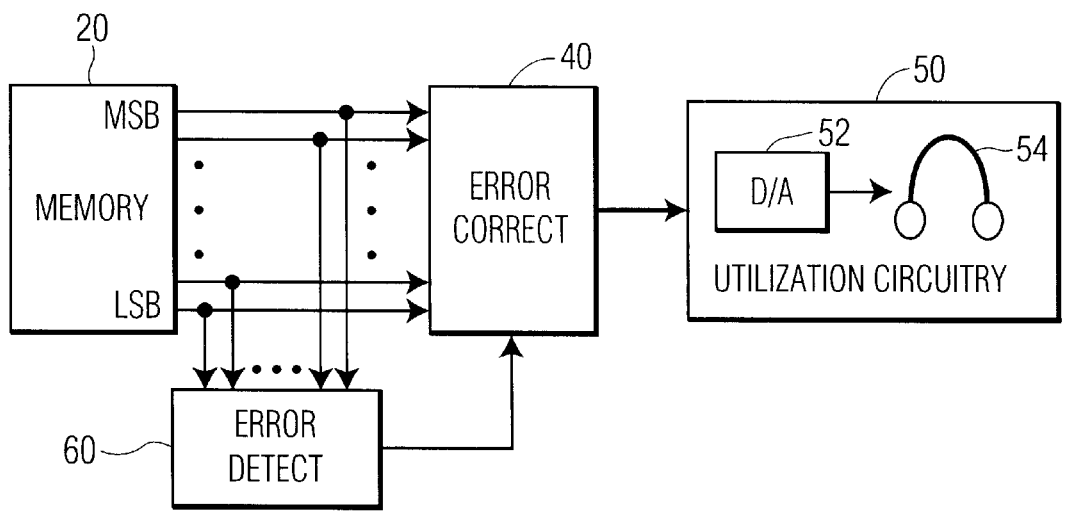
FIG. 2 is a block diagram of apparatus according to the present invention for reading data, previously written by the apparatus of FIG. 1, from the memory device.

FIG. 2 is a block diagram of apparatus according to the present invention for reading data, previously written by the apparatus of FIG. 1, from the memory device 20. In FIG. 2, the memory device 20 is the same memory device illustrated in FIG. 1. An output terminal of the memory device 20 is coupled to respective input terminals of an error detector 60 and an error corrector 40. The error detector 60 corresponds to the error detecting code generator 30 (of FIG. 1) and may be any circuit which provides an indication of the integrity of the data encoded by the error detecting code generator 30. In the illustrated embodiment, the error detecting code generator is a parity generator, and the error detector is a parity check circuit 60. An output terminal of the error detector 60 is coupled to a control input terminal of the error corrector 40.

A multibit output terminal of the error corrector 40 produces a stream of successive error-corrected multibit digital samples (represented by the thick signal line) in a manner described in more detail below, and is coupled to a corresponding input terminal of utilization circuitry 50. Continuing the example of FIG. 1 in FIG. 2, the utilization circuit 50 contains a digital-to-analog (D/A) circuit 52 which converts sixteen bit samples from the error corrector 40 into an analog signal. This analog signal is coupled to a pair of headphones 54 used by a listener to hear the audio from the CD 2 (of FIG. 1).

In operation, the memory device 20 retrieves data signal samples from locations in the memory device 20 controlled in a known manner by the memory controller (not shown). The retrieved samples may have bits which are not the same as those of the previously stored sample. The error detector 60 performs a data integrity check on the retrieved sample and generates an error signal when an error has been detected in the retrieved sample. This error signal is supplied to the error corrector 40, which performs a correction function, described in more detail below, in response to the error signal. The error corrector 40 produces a stream of successive multibit digital samples which either represent the originally stored data signal or reduce the noise introduced into the signal due to errors caused by the memory device 20 (e.g. by linear interpolation between the last good data sample and the next good data sample). The error corrector 40 supplies that sample stream to the utilization circuitry 50. The combination of the error detector 60 and error corrector 40 provides a correction function in the event that a digital sample is retrieved from a detective location in the memory device 20. The utilization circuitry 50 processes the error corrected data stream. For example, in a tapeless sound recorder, the utilization circuitry may include a digital-to-analog converter, audio amplifier and speaker.

The embodiment illustrated in FIGS. 1 and 2 substitute a single parity bit for the LSB of the data sample, and calculate that parity bit from the remaining 15 bits of the data sample. However, an EDC generator calculating parity bit over 15 bits is a relatively complex and expensive circuit, which can also introduce a relatively long delay into the processing path.

Figure 3:
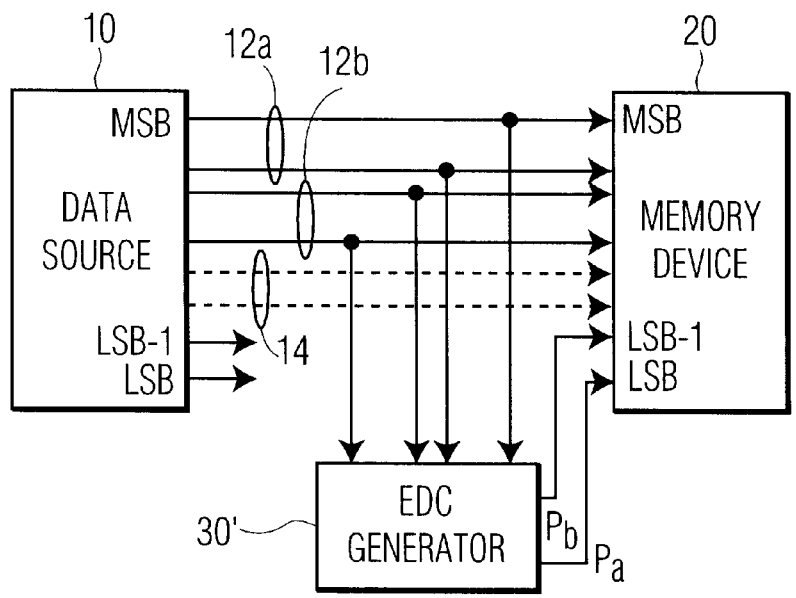
FIG. 3 is a block diagram of an alternate embodiment of apparatus according to the present invention for writing data into a memory device.

FIG. 3 is a block diagram of an alternate embodiment of the present invention. In FIGS. 3 through 6, elements which are the same as those illustrated in FIGS. 1 and 2 are designated by the same reference numbers, and are not described in detail below. In FIG. 3, the bits of data from the data source 10 (which may be a CD player as illustrated in FIG. 1) are partitioned into a first set of bits 12a and a second set of bits 12b. All the bits in both sets of bits, 12a and 12b, are supplied to both the memory device 20 and to EDC generator 30'. EDC generator 30' includes two parity generating circuits (not shown) of known design, a first one calculating the parity $P_a$ on the first set of data bits 12a, and a second one calculating the parity $P_b$ on the second set of data bits 12b. These two parity bits, $P_a$ and $P_b$, are substituted for the two least significant bits, LSB and LSB-1, from the data source 10, respectively, in the memory device 20, in the manner described above.

Figure 4:
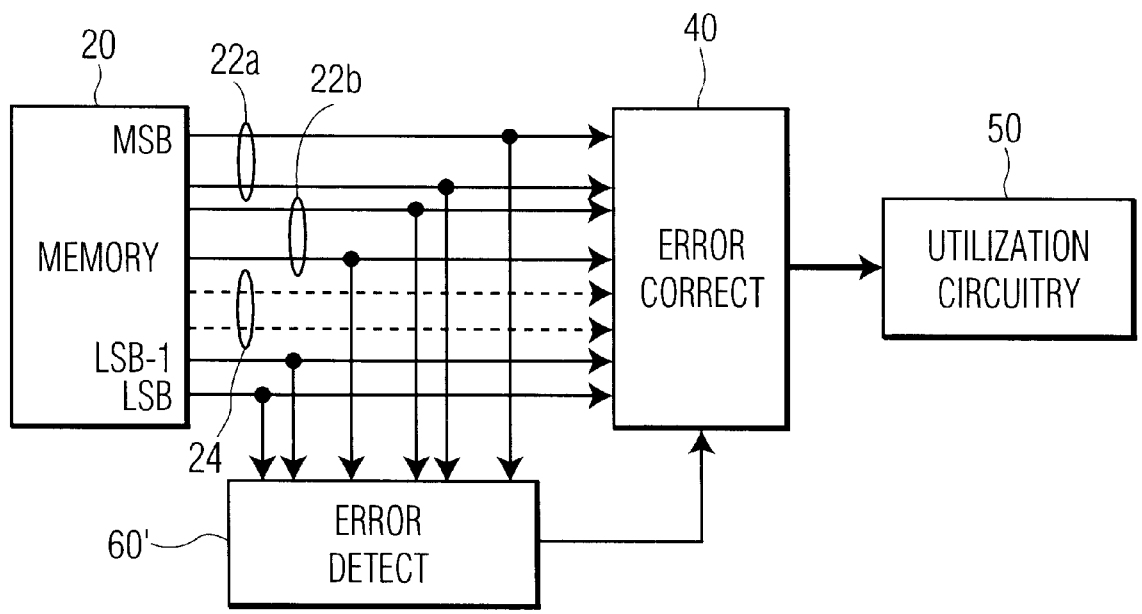
FIG. 4 is a block diagram of apparatus according to the present invention for reading data, previously written by the apparatus of FIG. 3, from the memory device.

FIG. 4 is a block diagram of apparatus for reading data, previously written by the apparatus of FIG. 3, from the memory device 20. In FIG. 4, a first set of bits 22a read from the memory 20 (corresponding to the first set of bits 12a written into the memory 20), a second set of bits 22b read from the memory 20 (corresponding to the second set of bits 12b written into the memory 20), and the two parity bits from the LSB and LSB-1 of the memory 20 are all coupled to respective input terminals of an error detector 60' and the error corrector 40. The error detector 60' contains two parity detectors (not shown): a first one processing the first set of bits 22a and the LSD containing the corresponding parity bit $P_a$; and a second parity detector processing the second set of bits 22b and the LSB-1 containing he corresponding parity bit $P_b$. If a parity error is detected by either of these parity detectors, a signal is supplied to the error corrector 40 conditioning it to perform error correction in a manner to be described in more detail below. As in FIG. 2, the utilization circuit 50 may be a CD player, including headphones.

In the illustrated embodiment, the 16 bit data to be transferred from the data source 10 to the memory device 20 has the two least significant bits, LSB and LSB-1, reserved for the two parity bits $P_a$ and $Y_b$. Then the remaining 14 bits are partitioned into two 7 bit sets, 12a and 12b. Such a system requires only 7 bit parity generators and detectors. The resolution of the data stored in the memory device 20 is 14 bits.

Figure 5:
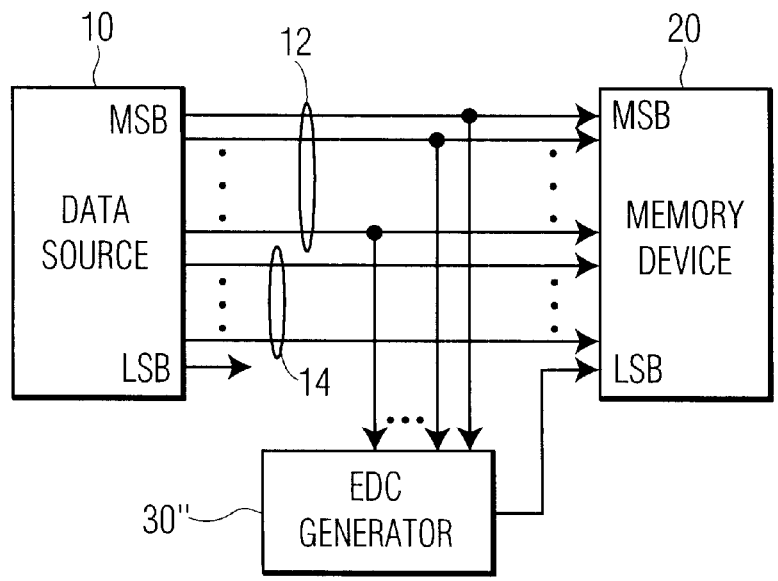
FIG. 5 is a block diagram of another alternate embodiment of apparatus according to the present invention for writing data into a memory device.

FIG. 5 is a block diagram of another embodiment of the invention. In FIG. 5, the data from the data source 10 (which may be similar to that illustrated in FIG. 1) is again partitioned into a first set of bits 12 and a second set of bits 14. The first set of bits 12 from the data source 10 is coupled to respective input terminals of an EDC generator 30" and the memory device 20. The second set of bits 14 from the data source 10 is coupled only to the memory device 20. The LSB from the data source 10 is discarded. The EDC generator 30" contains a parity generator which calculates a single parity bit over the first set of bits 12, only. This parity bit is substituted for the LSB from the data source 10 in the data written into the memory device 20.

Figure 6:
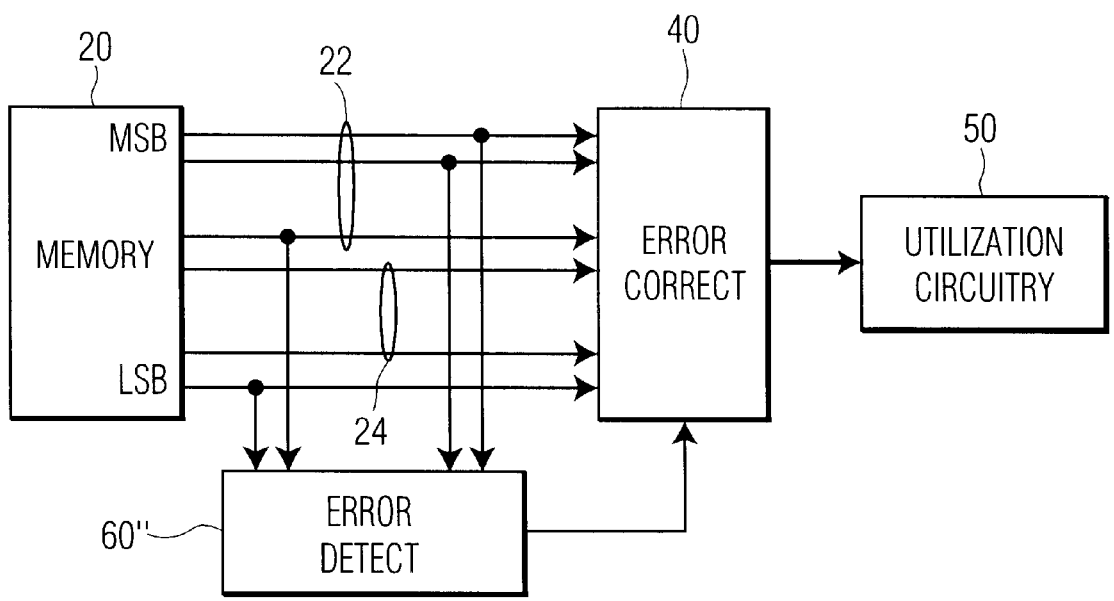
FIG. 6 is a block diagram of apparatus according to the present invention for reading data, previously written by the apparatus of FIG. 5, from the memory device.

FIG. 6 is a block diagram of apparatus for reading data, previously written by the apparatus of FIG. 5, from the memory device 20. In FIG. 6, a first set of bits 22 from the memory device 20, corresponding to the first set of bits 12 from the data source 10, is coupled from the memory device 20 to respective input terminals of the error detector 60" and error corrector 40. A second set of bits 24 from the memory device 20, corresponding to the second set of bits 14 from the data source 10, is coupled only to the error corrector 40. The LSB from the memory device 20, containing the parity bit calculated over the first set of bits 22, is also coupled to the error detector 60". The error detector 60" contains a parity detector (not shown) which detects an error in the parity over the first set of bits 22, and sends a signal to the error corrector 40 conditioning it to perform error correction in a manner to be described below. As before, the utilization circuit 50 may be as illustrated in FIG. 2.

In the Illustrated embodiment, the ten moist significant bits from the data source 10 form the first set of bits 12. Parity is calculated over these ten bits by the EDC generator 30", and the parity bit substituted for the LSB from the data source 10 in the data written to the memory device 20. The remaining five bits form the second set of bits 14 from the data source 10. These bits are ignored by the EDC generator 30". This system allows for a simpler parity generator 30" and detector 60", e.g. ten bits instead of 15 bits. The resolution of the data from the memory device 20 is 15 bits.

An error occurring in the ten most significant bits in the first set of bits 12 will be detected and error correction performed to minimize the perceptibility of the distortion caused by that error. An error may occur and go undetected in the five lesser significant bits in the second set of bits 14. However, the distortion caused by such an error would be relatively imperceptible by a user, and is expected to occur relatively rarely. The remainder of the time, when no errors occur, a full 15 bits of resolution will be available.

It is further possible to combine these two techniques. Referring back to FIGS. 3 and 4, a third set of bits 14 is illustrated in phantom which are ignored by the EDC generator 30' and error detector 60', as described above with respect to FIGS 5 and 6. If the same five bits are partitioned into the third set of bits 14, then only 10 bits remain to be partitioned into a first set of five bits 12a and a second set of five bits 12b. This arrangement would require two, relatively simple, five bit parity generators in the EDC generator 30'. Similarly when the five bits in a third set of bits 24, corresponding to the third set of bits 14 from the data source 10, are read from the memory 20 they are ignored by the error detector 60' which would require only two relatively simple five bit parity detectors for the first set of bits 22a and second set of bits 22b.

As described explicitly for FIGS. 1 and 2, the arrangements illustrated in FIGS. 3 through 6 are also particularly applicable to portable CD players which use headphones. Such an application will not incur perceptible degradation of the audio due to the decreased resolution of the samples because of the decreased audio response characteristics of the headphones. Any other such audio application would be equally amenable to the present invention.

Figure 7:
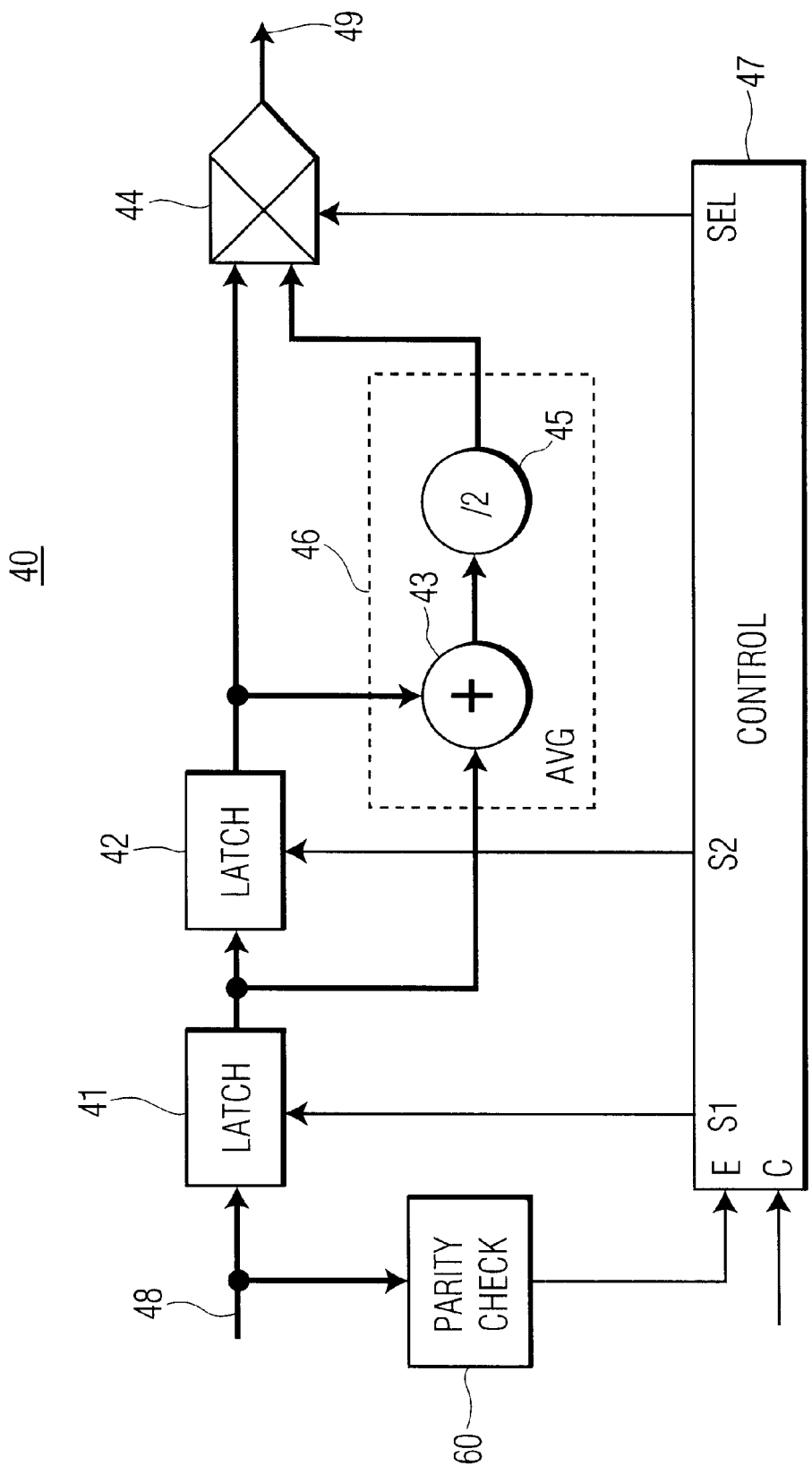
FIG. 7 is a more detailed block diagram of a portion of the read apparatus illustrated in FIGS. 2, 4 and 6.
Figure 8:
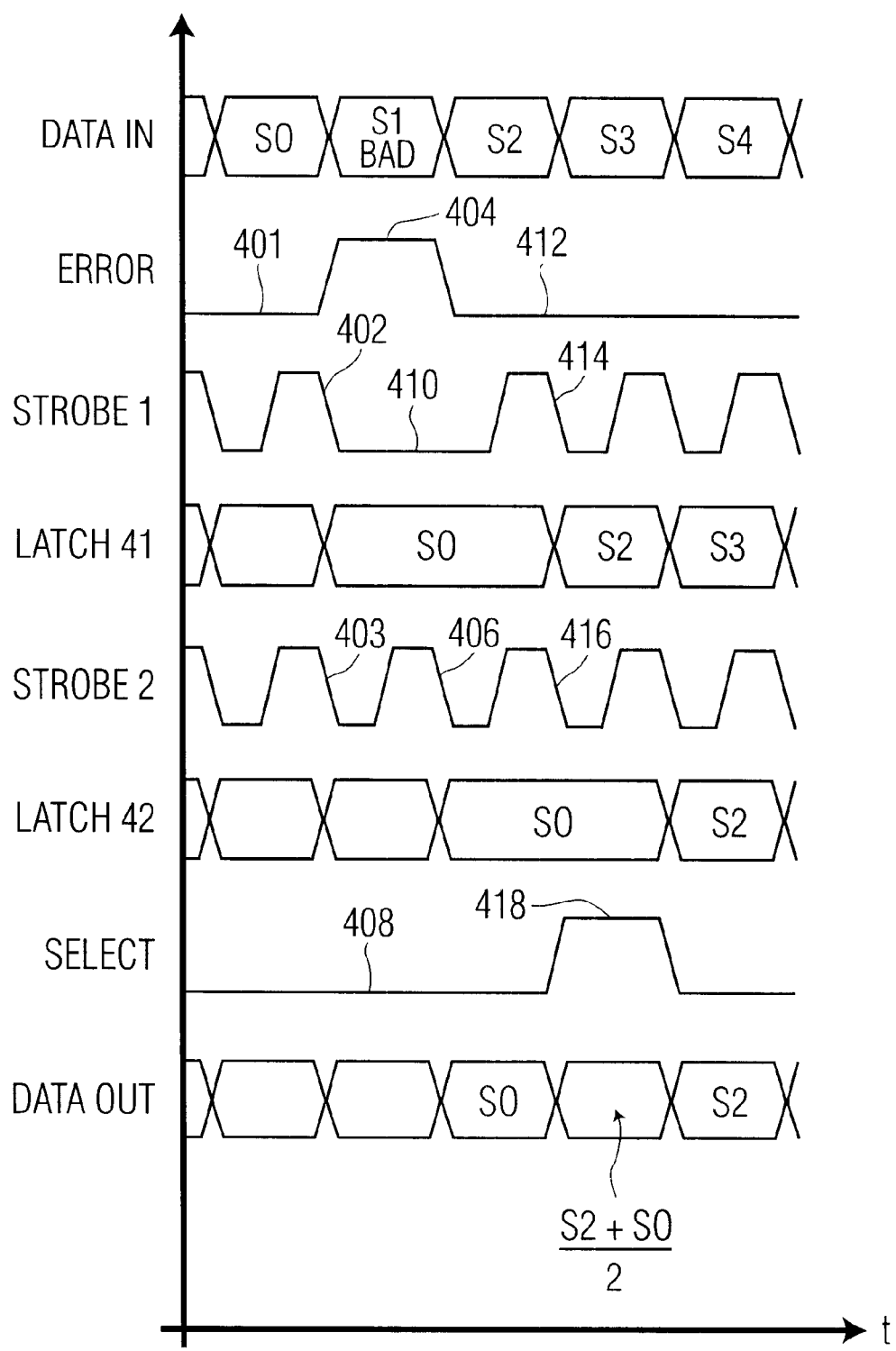
FIG. 8 and FIG. 9 are waveform diagrams useful in understanding the operation of the portion of the read apparatus illustrated in FIG. 7.
Figure 9:
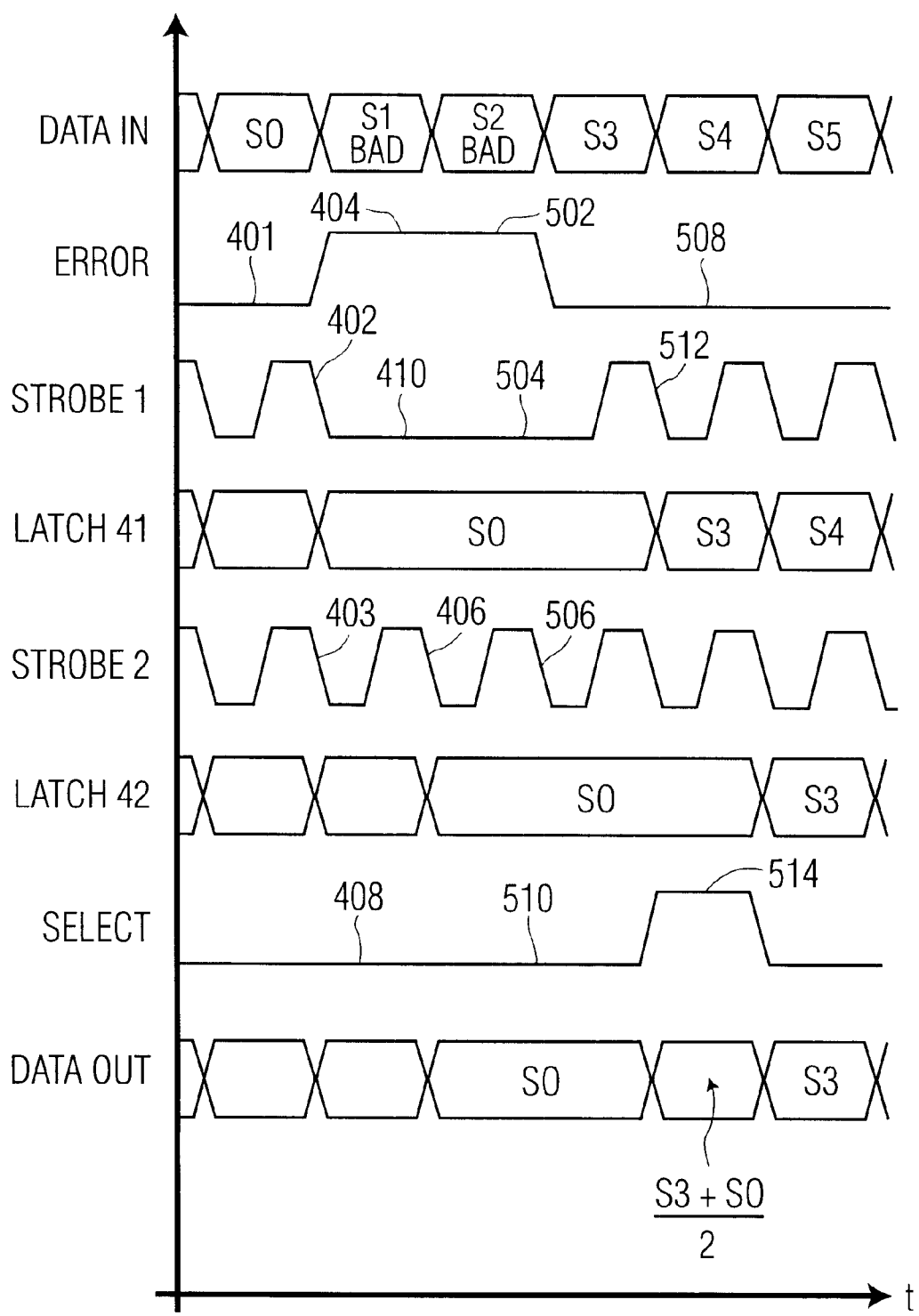

FIG. 7 is a more detailed block diagram of the error corrector 40 illustrated in FIG. 2; and FIGS. 8 and 9 are waveform diagrams useful in understanding the operation or the portion of that apparatus. In FIG. 7, thick signal lines represent signal paths carrying multibit digital signals, and thin signal lines represent signal paths carrying either single bit digital signals, or clock signals. In FIG. 7, an input terminal 48 is coupled to the output terminal of the memory 20 (of FIGS. 2, 4 and 6). Input terminal 48 is coupled to an input terminal of the parity check circuit 60 (corresponding also to parity check circuit 60' of FIG. 4 and parity check circuit 60" of FIG. 6) and a data input terminal of a first latch 41. An output terminal of the first latch 41 is coupled to a data input terminal of a second latch 47 and a first input terminal of an adder 43. An output terminal of the second latch 42 is coupled to a first data input terminal of a multiplexer 44 and a second input terminal of the adder 43. An output terminal of the adder 43 is coupled to a second data input terminal of the multiplexer 44 through a divide-by-two circuit 45. The combination of the adder 43 and divide-by-two circuit 45 forms an averaging circuit 46. An output terminal of the multiplexer 44 is coupled to an output terminal 49. The output terminal 49 is coupled to the input terminal of the utilization circuitry 50 (of FIGS. 2, 4 and 6).

The parity error output terminal of the parity check circuit 60 is coupled to an error input terminal E of a control circuit 47. A clock generator (not shown) is coupled to a clock input terminal C of the control circuit 47. A first strobe output terminal S1 of the control circuit 47 as coupled to a control input terminal of the first latch 41; a second strobe output terminal S2 of the control circuit 47 is coupled to a control input terminal of the second latch 42, and a multiplexer control signal output terminal SEL of the control circuit 47 is coupled to a control input terminal of the multiplexer 44.

The operation of the apparatus illustrated in FIG. 7 will be explained in conjunction with the waveform diagrams illustrated in FIG. 8 and FIG. 9. In operation, a clock generator (not shown) produces a clock signal in synchronism with the digital data samples produced by the memory 20 in a known manner. Referring to FIG. 8, the sequence of samples is illustrated in the top line, DATA IN. The first illustrated sample, is S0, the next is S1, and so forth. The error signal at the error input terminal E of the control circuit 47 is illustrated on the second line, ERROR, of FIG. 8. When this signal is low, it indicates that no error has occurred in the corresponding sample, and if the signal is high, it indicates that a parity error has been detected by the parity check circuit 60.

The error signal for each sample is evaluated by the control circuit 47. When the error signal indicates that no error has occurred, the control circuit 47 provides a strobe signal, STROBE 1, illustrated on the third line of FIG. 8, to the first latch. 41. At the falling edge of the first strobe signal, STROBE 1, he first latch 41 latches the signal from the input data input terminal 48, and supplies it to its output terminal in a known manner. The output from the first latch 41 is illustrated as the fourth line in FIG. 8.

In a similar manner, the control circuit 47 supplies a second strobe signal, STROBE 2, illustrated on the fifth line of FIG. 8, to the second latch 42. In response to the falling edge of the second strobe signal, STROBE 2, the second latch 42 latches the signal from the output terminal of the first latch 41, and supplies it to its output terminal in a known manner. The output from the second latch 42 is illustrated as the sixth line on FIG. 8.

In addition, the control circuit 47 also supplies the multiplexer control signal, SELECT, illustrated as the seventh line in FIG. 8, to the control input terminal of the multiplexer 44. When the multiplexer control signal, SELECT, is low, the multiplexer 44 is conditioned to pass the signal from the output terminal of the second latch 42 to the output terminal 49. When the multiplexer control signal, SELECT, is high, the multiplexer 44 is conditioned to pass the signal from the output terminal of the averaging circuit 46 to the output terminal 49.

So long as no parity errors are detected by the parity check circuit 60, the control circuit 47 continually supplies the first and second strobe signals (STROBE 1 and STROBE 2) to the first and second latches, 41 and 42, respectively, and the multiplexer control signal is maintained low, conditioning the multiplexer 44 to pass the signal from the second latch 42 to the output terminal 49. In this operating mode, the first and second latches, 41 and 42, act as pipeline registers and the input samples, DATA IN, are passed through the error handler 40 delayed, but without any changes.

If, however, the error signal, ERROR, at the error input terminal E of the control circuit 47 indicates that a parity error has occurred, the sample currently at the input terminal 48 is invalid. In this case, no strobe signal STROBE 1 is supplied to the first latch 41, and it continues to hold the most recent good sample. However, the second strobe signal, STROBE 2, is still supplied to the second latch, regardless of the state of the error signal ERROR from the control circuit 47. In addition, the multiplexer control signal SELECT is maintained low to condition the multiplexer 44 to pass the signal from the second latch 42 to the output terminal 49.

Referring to FIG. 8, the error signal ERROR is low during the sample time for sample S0, 401, indicating that sample S0 a good sample. In response, the trailing edge 402 of the first strobe signal, STROBE 1, latches the good sample S0 from the input terminal 48 (DATA INPUT) into the first latch 41, and it appears at its output terminal, as illustrated in the waveform LATCH 41. At the same time, the trailing edge 403 of the second strobe signal STROBE 2 latches the previous symbol (unlabeled) from the first latch 41 into the second latch 42 and it appears at its output terminal as illustrated in waveform LATCH 42. Also, the multiplexer control signal SELECT is low at that sample period 408, and the output signal from the second latch 42 is supplied to the utilization circuitry 50.

Sample S1, however, is found by the parity check circuit 60 to have bad parity, and the error signal, ERROR, is made high for the duration of sample S1, at 404, to indicate this. While the error signal, ERROR, is high, the control circuit 47 does not generate a first strobe signal STROBE 1. Thus, there is no strobe signal at 410 in the sample period after the trailing edge 402. This prevents the bad sample S1 from being latched into the first latch 41. Instead, the previous good sample, S0, remains at the output of the first latch 41.

The second latch 42, however, continues to receive the second strobe signal, STROBE 2, and it latches the signal from the output terminal of the first latch 41 to its output terminal in the normal fashion. For example, the trailing edge 406 of the second strobe signal, STROBE 2 causes the second latch 42 to latch the signal S0 which remained at the output terminal of the first latch 41 and supply it to its output terminal, LATCH 42.

If a single isolated sample is bad, that is if the next sample after a bad sample is a good sample, as indicated at 412 of the parity error signal ERROR from the parity check circuit 60, then both the first latch 41 and the second latch 42, again receive strobe signals in the normal manner. For example, in FIG. 8, after the bad sample, S1, the trailing edge 414 of the first strobe signal, STROBE 1, causes the first latch 41 to latch the next succeeding good sample S2 at the data input terminal 48 and supply it to its output terminal LATCH 41, while the trailing edge 416 of the second strobe signal STROBE 2 causes the second latch 42 latch the signal S0 and supply it to its output terminal LATCH 42. The output signal from the first latch 41 is the most recent good sample S2, and the output signal from the second latch 42 is the previous good signal S0.

As described above, the intervening bad sample was not latched. At this time, the averaging circuit 46 produces a signal which is the average of the value of the two signals, S0 and S2, latched by the first and second latches, 41 and 42, respectively. When the first good sample after a bad sample has been latched into the first latch 41, the multiplexer control signal supplied to the multiplexer 44 for this sample period, at 418, conditions the multiplexer 44 to couple the signal from the averaging circuit 46 to the output terminal 49. In this manner, if an isolated sample is bad, it is replaced with a sample having the average of the two good samples surrounding it.

FIG. 9 is a waveform diagram illustrating the operation of the circuit illustrated in FIG. 7 responding to different input signal conditions. In FIG. 9, two samples in a row, S1 and S2, have parity errors detected. The operation of the circuit of FIG. 7, up to the reception of the second bad sample S2, is similar to the operation of that circuit illustrated in FIG. 8 and that operation is not described in detail below. Time 502 of the parity error signal ERROR, indicates that the sample S2 also contains a parity error. Because sample S2 is also bad, then, as before, no first strobe signal STROBE 1 is supplied to the first latch 41. Thus, at 504 of the first strobe signal STROBE 1, no strobe signal occurs, and the previous good sample S0 remains in the first latch 41. However, at 506 of the second strobe signal STROBE 2, the second latch 42 relatches the last good sample S0 from the first latch 41, and supplies it to its output terminal LATCH 42. At this time, both the first latch 41 and the second latch 42 contain the Last good sample S0. At time 510, the multiplexer control signal SELECT is maintained low, and the multiplexer 44 is conditioned to continue to pass the signal from the second latch 42 to the output terminal 44. This will continue so long as bad samples are received at the input terminal 48.

At time 508, the parity error signal ERROR is low, indicating that the next sample, S3 does not contain a parity error. As described above, in response, the trailing edge 512 of the first strobe signal STROBE 1 latches the most recent good sample 33 into latch 41, which passes it to its output terminal LATCH 41. At this time, the first latch 41 contains the most recent good sample S3, and the second latch 42 contains the last good sample S0. Also at this time, the averaging circuit 46 produces a signal which is the average of those two samples. As before, when a first good sample is latched into the first latch 41 after a bad sample had been previously received, the multiplexer control signal SELECT, at 514, is made high, which conditions the multiplexer 44 to couple the signal from the averaging circuit 46 to the output terminal 49. In this manner, if a series of bad samples is received, the last good sample is repeated at the output terminal, until another good sample is received. Then, one sample containing the average of the last received good sample and the newly received good sample is produced before the error corrector 40 resumes its normal operational mode.

The present invention has been described with reference to an embodiment fabricated from discrete components. One skilled in the art will understand that the invention may also be practiced by the use of a microprocessor programmed to access a memory device 20 and execute a program to process data samples as described above.

What is claimed is:

1. A method for concealing errors in stored digital samples, comprising the steps of:
   receiving a multibit digital input sample;
   calculating an error detecting code, corresponding to the input sample, containing a predetermined number of bits;

forming a multibit digital storage sample by substituting a predetermined number of error detecting code bits for a predetermined number of least significant bits of the input sample;

storing the storage sample in a memory device;

retrieving a previously stored sample from the memory device;

examining the retrieved sample to detect an error; and if an error is detected, producing a substitute sample for the retrieved sample, otherwise producing the retrieved sample; wherein the step of calculating an error detecting code comprises the steps of:

partitioning the input sample into a plurality of sets of bits; and calculating a plurality of parity bits respectively corresponding to the plurality of sets of bits, as the error detecting code.

2. A method according to claim 1, wherein the steps of examining a retrieved sample to detect an error compromises the steps of:

partitioning the retrieved sample into a plurality of sets of bits respectively corresponding to the plurality of sets of bits in the input signal: and determining the sets of bits in the retrieved sample and its corresponding parity bit in the error detecting code, and if the parity of any of the combinations is not a predetermined parity detecting an error.

3. In a portable compact disk (CD) player, including headphones, a method for concealing errors in stored digital samples, comprising the steps of:

receiving a sixteen bit digital input sample from playback electronics in the CD player;

partitioning the input sample into a first set of bits containing ten most significant bits, a second set of bits containing five next most significant bits, and a least significant bit;

calculating a parity bit corresponding to the first set of bits in the input sample;

forming a multibit digital storage sample by substituting the parity bit for the least significant bit of the input sample;

storing the storage sample in a memory device;

retrieving a previously stored sample from the memory device;

partitioning the retrieved sample into a first set of bits containing ten most significant bits, a second set of bits containing five next most significant bits, and a least significant bit;

determining the parity of a combination of the first set of bits and the least significant bit of the retrieved sample, and if the parity is not a predetermined parity, detecting an error;

if an error is detected, producing a substitute sample for the retrieved sample, otherwise producing the retrieved sample; and processing the produced sample to produce a signal for the headphones.

4. An apparatus for concealing errors in stored digital samples comprising:

a source of a multibit digital input sample;

an error detecting code generator coupled to the input sample source and generating an error detecting code having a predetermined number of bits comprising a parity generator responsive to one of a plurality of sets of bits in the multibit digital input sample;

a memory device for storing a storage sample comprising the input sample in which the error detecting code has been substituted for a predetermined number of least significant bits of the input sample, and retrieving a previously stored storage sample;

an error detector, coupled to the memory, for detecting an error in the retrieved sample; and an error corrector, coupled to the memory and the error detector for producing substitute samples if an error is detected and producing the retrieved storage sample otherwise.

5. The apparatus of claim 4 wherein the error detector comprises a parity error checker responsive to bits in the retrieved sample corresponding to the one set of bits in the multibit digital input sample.

6. In a portable compact disk (CD) player, apparatus for concealing errors in stored digital samples, comprising:

playback electronics producing a sixteen bit digital input sample;

a parity generator, coupled to the playback electronics, for generating a parity bit corresponding to ten most significant bits of the input sample;

a memory device for storing a storage sample comprising the input sample in which the parity bit has been substituted for a least significant bit of the input sample and retrieving a previously stored storage checker sample;

a parity error checker, coupled to the memory, for detecting incorrect parity of a combination of ten most significant bits and a least significant bit of the retrieved sample;

an error checker, coupled to the memory and the parity error checker for producing a substitute sample if an incorrect parity is detected and producing the retrieved storage sample otherwise;

circuitry, responsive to the produced sample, for generating an outdoor signal; and headphones, responsive to the output signal.

* * * * *